Sept. 20, 1955  S. C. MOON  2,718,381
AUGER SOCKET
Filed June 20, 1952
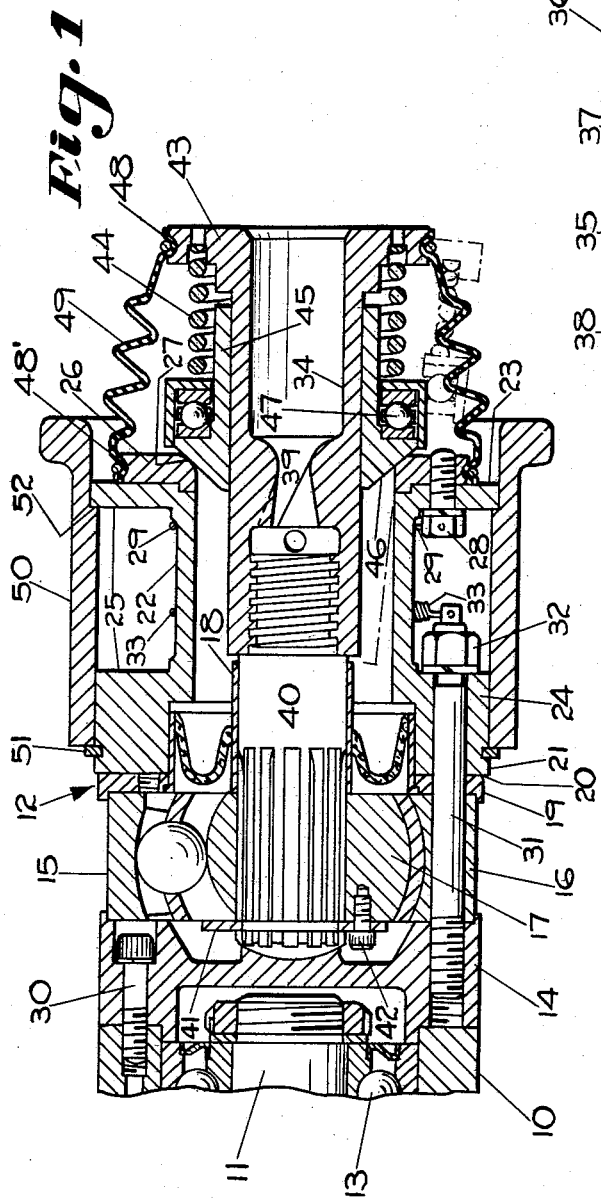
INVENTOR;
STERLING C. MOON,
BY
ATT'Y.

United States Patent Office 2,718,381
Patented Sept. 20, 1955

2,718,381

AUGER SOCKET

Sterling C. Moon, Worthington, Ohio, assignor to The Jeffrey Manufacturing Company, a corporation of Ohio Application June 20, 1952, Serial No. 294,644

4 Claims. (Cl. 255—46)

This invention relates to auger driving sockets, holders or receiver assemblies, and an object of the invention is to provide improved apparatus of this type including improved guard means.

More specifically, it is another object of the invention to provide an improved auger driving socket assembly wherein means for securing its parts together are guarded by a rotatable sleeve.

Other objects of the invention will appear hereinafter the novel features and combinations being set forth in the appended claims.

In the accompanying drawings:

Fig. 1 is a view in longitudinal section taken through a flexible auger socket assembly embodying the invention and showing members of a drilling machine that carries and drives the auger socket assembly;

Fig. 2 is a view in elevation on a larger scale looking at the right hand end of the auger socket member of the assembly seen in Fig. 1; and Fig. 3 is a view in elevation of the shank end of a mine auger or drill bit adapted to be received by the auger socket assembly.

The flexible auger socket shown in the drawings is adapted to mount and drive a mine auger or drill bit which may be used, for example, in drilling shot or blast holes in a mine. This auger socket is adapted to be carried by a truck mounted drill apparatus, such for example, as the mine drill apparatus which I have shown and described in my co-pending application Serial No. 184,017, filed September 9, 1950, now Patent No. 2,610,029, dated September 9, 1952, for a Drill Feed Mechanism with Reciprocating Non-rotating Feed Cylinder, and in fact, some parts of this machine are shown in the drawings in association with the flexible auger socket that embodies this invention. It may be mentioned that the mine drill apparatus disclosed in my co-pending application Serial No. 184,017, now Patent No. 2,610,029, above identified, includes a vehicle in the form of a truck that carries a boom structure capable of swinging rotary motion about a plurality of axes and upon the outer end of which there is mounted a power driven drill apparatus, also mounted for swinging rotary motion about a plurality of axes. The combined swinging rotary motions of the boom and the mounting means on the end thereof for carrying the drill enable the drill to be positioned in any of many positions to drive a mine auger carried by the drill into a wall of a mine room.

Referring now to the drawings, the drill includes a head 10 carried upon the front end of a rotary auger tube (not shown) and this rotary head 10 and auger tube may be moved rectilinearly along the axis of the auger tube by a piston rod 11 of a double acting hydraulic motor, also not shown, to advance and retract an auger socket 12 toward and from a coal face that is carried on the front end of the head 10. The piston rod 11 is connected to the head 10 through a ball bearing assembly 13 in order that the head 10 may rotate while the piston rod 11 does not.

The auger socket 12 includes a cap, face plate or disc 14 that abuts the front end of the head 10 and abutting this cap, face plate or disc 14, there is structure which in effect provides a constant velocity universal joint 15 that includes an outer body 16 and a hub 17. A lubricant retainer 18 for the constant velocity universal joint 15 that includes a ring-like plate 19 is clamped to the outer body 16 by an end surface 20 of a hollow cylindrical housing or member 21. Member 21 is formed to include a reduced diameter portion 22 located between a pair of radially extending flanges 23 and 24 that provide spaced radial walls 25. Flange 23 carries a face ring 26 that provides a cam surface 27 on the front open end of the hollow housing or member 21. This face ring 26 is secured to the member 21 by a plurality of cap screws 28 that extend axially in the auger socket 12 and through the radial wall 25 on the flange 23 and are threaded into the face ring 26. It is to be noted that the heads of cap screws 28 are contained within the peripheral groove formed by the reduced diameter portion 22 and the spaced walls 25 of flanges 23 and 24 and that these cap screws are safety wired by a wire 29, which also is contained within said groove.

The cap, face plate or disc 14, is fastened to the drill head 10 by a plurality of cap screws 30 that extend axially in the auger socket 12 and the heads of which are seated in recesses and covered by the outer body 16 of the universal joint 15. The body 16 of the universal joint 15, the plate 19, and the hollow cylindrical housing member 21 are secured to the cap, face plate or disc 14 by a plurality of stud bolts 31 that also extend axially in the auger socket 12. Stud bolts 31 extend through flanges 24 of the hollow member 21 and into the groove provided by the reduced diameter portion 22 and the spaced walls 25 of flanges 23 and 24 and they receive nuts 32 that are safety wired by a wire 33. Nuts 32 and safety wire 33 are contained within the above described peripheral groove.

Within the generally hollow cylindrical outer housing assembly or unit provided by the elements 14, 16, 19, and 21 there extends axially an auger bit carrier, receiver or socket member 34 that is formed by a casting. This socket member 34 is hollow to receive the shank end of the mine auger or drill bit 35 shown in Fig. 3 of the drawings. The shank end of the auger or drill bit 35 includes a flange 36, a cylindrical portion 37 and a drive stub 38. Stub 38 projects axially from the cylindrical portion 37 and when viewed in a plane perpendicular to said axis, the stub 38 is substantially rectangular and it is twisted as it progresses along said axis. The socket member 34 is hollow to receive the shank end of the auger 35 and when the auger is mounted within the socket 34 flange 36 abuts the front end of the member 34 and the stub 38 projects into a twisted slot 39 formed in the member 34.

Socket member 34 is threaded on the front of a splined stub shaft 40 that is received by the hub 17 of the universal joint 15 and the rear end of this shaft 40 is formed as a segment of a sphere and engages and cooperates with a socket formed on the cap or face plate 14 to prevent movement of the auger bit carrier to the left, as seen in Fig. 1 of the drawings, while permitting the auger bit carrier to rotate on an axis making an acute angle with the single normal axis of rotation of the outer housing formed by the elements 14, 16, 19, 21 and 26. Stub shaft 40 is provided with a circumferential groove that receives a key 41 secured by cap screws 42 to the hub 17. This key and slot retain the auger bit carrier against axial movement to the right as seen in Fig. 1 of the drawings.

Socket member 34 has a cylindrical outer surface and it is provided with a radially outwardly extending end flange 43 including a circular groove in which a compression spring 44 that surrounds the member 34 is seated. Flange 43 is also provided with axially extending bores in which a spanner or pin-type wrench may be inserted for removing the socket 34 from the stub shaft 40. Member 34 carries on its outer surface a sleeve 45 that may slide axially along it and one end surface of which forms a cam 46 in the shape of a frustum of a cone. Cam 46 seats in the open end or cam face 27 of the member 21 and it is urged thereinto to maintain the rotary axis of the generally hollow cylindrical outer housing formed by the elements 14, 16, 19, 21 and 26 and the auger bit socket or carrier formed by the elements 40 and 34 co-incident under ordinary operating conditions of the apparatus by the spring 44 acting on the sleeve 45 through a thrust-bearing 47. Apparatus similar to the mechanism thus far described, with the exception of the cast auger socket member 34, is described and claimed in application Serial No. 255,691, filed November 9, 1951, by Ernst F. Muller for a Flexible Auger Socket.

The flange 43 of socket member 34 and the face ring 26 on the front of the hollow cylindrical housing or member 21 is each provided with a peripheral groove 48 and 48' respectively and between these members there extends a flexible cover or dirt protector member 49 in the form of a bellows which is secured thereto by clamp wires drawn tightly thereabout so as to compress the cover or protector member 49 into the grooves 48 and 48'. The rear portion of this protector member is guarded by a sleeve 50 that is carried by the member 21 and which projects forwardly therefrom over the flexible protector 49. Sleeve 50 is carried for rotation only upon the member 21 and it rides upon the outer cylindrical surface of the rear flange 24, which flange is provided with a peripheral groove that receives a snap ring 51 which abuts the rear end of the guard sleeve 50 for preventing its rearward movement axially along member 21. Guard sleeve 50 extends forwardly from flange 24 and spans the groove formed by the reduced portion 22 and the spaced radial walls 25 of member 21 and the front of sleeve 50 is carried upon the outer cylindrical surface of flange 23. Flange 23 is of larger diameter than the flange 24 and sleeve 50 is provided with an internal cylindrical shoulder 52 that abuts the flange 23 to prevent forward axial movement of the sleeve 50 along member 21.

During normal operation of the flexible auger socket above described, that is, when the auger bit is not under bending strain, the axes of the rotary members are coincident, but when for any reason the auger is placed under a bending strain the axis of rotation of it, the socket 34 and the stub shaft 40 will depart from the normal axis of rotation of the entire assembly to relieve the strain upon the auger and thereby prevent its breaking or placing unwanted strains upon the drill apparatus. Whenever the axis of roation of the auger or drill bit 27 deviates from the normal axis of rotation of the assembly the sleeve 45 is cammed forwardly along the auger socket 34 to compress spring 44 and when the bending strain on the auger or drill bit 35 is relieved the spring 44 and cam surfaces 27 and 46 cooperate to center the auger carrier; that is, to cause its axis of rotation to become coincident with the normal axis of rotation of the assembly.

When the auger socket is in use it frequently happens that it is brought into contact with objects in the mine such as the mine room walls, posts and the like and therefore any exposed radially projecting mechanisms thereof, such for example, as the bolts that fasten its elements together, or the rear end of the flexible drill protector or guard 49 and its fastening wire, might be damaged by rubbing on these objects. From the foregoing description it will be obvious that all of the means for securing the elements of the improved auger socket apparatus together are at all times guarded from damage caused by such action and that the guard sleeve 50, which guards certain of them and the flexible protector 49, is free to rotate upon the member 21 and is held against axial movement thereon. It will also be seen that the heads of screws 28, the nuts 32 and lock wires 29 and 33 are contained within the groove in the member 21 provided by the reduced diameter portion 22 and the spaced walls 25 of the flanges 23 and 24 which groove is covered and protected by the sleeve 50. It will also be apparent that access to these fastening devices may be had by merely removing the snap ring 51 and sliding the sleeve 50 axially rearwardly on the member 21.

Obviously those skilled in the art may make various changes in the details and arrangement of parts without departing from the spirit and scope of the invention as defined by the claims hereto appended and applicant wishes therefore not to be restricted to the precise construction herein disclosed.

Having thus described and shown an embodiment of the invention, what it is desired to secure by Letters Patent of the United States is:

1. Auger mounting apparatus for a mine drill including a plurality of elements adapted to rotate about an axis, one of said elements comprising a housing having a cylindrical portion, spaced radially outwardly extending wall means adjacent each end of the cylindrical portion of said housing forming a peripheral groove between them, means for receiving and driving a mine auger mounted to rotate normally on said axis, means including a dirt protector interconnecting said housing and said auger mounting means, means within said peripheral groove adapted to secure said plurality of elements together, a guard sleeve surrounding said housing and extending over said peripheral groove and over said dirt protector thereby guarding said securing means and said dirt protector means mounting said guard sleeve for relative rotation with respect to said housing, and removable means securing said guard sleeve against axial movement with respect to said housing.

2. Auger mounting apparatus for a mine drill including a plurality of elements adapted to rotate about an axis, one of said elements comprising a housing having a cylindrical portion, spaced radially outwardly extending wall means adjacent each end of the cylindrical portion of said housing forming a peripheral groove between them, means for receiving and driving a mine auger mounted to rotate normally on said axis, means including a dirt protector interconnecting said housing and said auger mounting means, means within said peripheral groove adapted to secure said plurality of elements together, a guard sleeve surrounding said housing and extending over said peripheral groove and over said dirt protector thereby guarding said securing means and said dirt protector, and means mounting said guard sleeve for relative rotation with respect to said housing.

3. Auger mounting apparatus for a mine drill including a plurality of elements adapted to rotate about an axis, one of said elements comprising a housing having a cylindrical portion, spaced radially outwardly extending wall means one adjacent each end of the cylindrical portion of said housing forming a peripheral groove between them, means within said peripheral groove adapted to secure said plurality of elements together, a guard sleeve surrounding said housing and extending over said peripheral groove thereby guarding said securing means, and removable means securing said guard sleeve against axial movement while permitting rotary motion of said guard sleeve with respect to said housing.

4. Auger mounting apparatus for a mine drill including a plurality of elements adapted to rotate about an axis, one of said elements being hollow, means in said hollow element for receiving and driving a mine auger mounted to rotate normally on said axis, means including a dirt protector interconnecting said one element and said auger mounting means, a guard sleeve extending over and guarding said dirt protector, means mounting said guard sleeve for relative rotation with respect to said one element, and means limiting movement of said guard sleeve axially along said one member.

References Cited in the file of this patent

UNITED STATES PATENTS

| | | |
|---|---|---|
| 1,186,751 | Cooper | June 13, 1916 |
| 2,323,569 | Rzeppa | July 6, 1943 |
| 2,381,102 | Boyd | Aug. 7, 1945 |

FOREIGN PATENTS

| | | |
|---|---|---|
| 181,204 | Switzerland | Feb. 17, 1936 |